United States Patent [19]
Barth et al.

[11] Patent Number: 5,045,996
[45] Date of Patent: Sep. 3, 1991

[54] MULTIPROCESSOR CACHE MEMORY HOUSEKEEPING

[75] Inventors: Richard M. Barth; Jeffrey H. Hoel, both of Palo Alto, Calif.

[73] Assignee: Xerox Corporation, Stamford, Conn.

[21] Appl. No.: 436,960

[22] Filed: Nov. 15, 1989

Related U.S. Application Data

[63] Continuation of Ser. No. 929,967, Nov. 12, 1986, abandoned.

[51] Int. Cl.$^5$ .................... G06F 12/08; G06F 12/12
[52] U.S. Cl. .................... 364/200; 364/243; 364/243.4; 364/243.41; 364/243.44
[58] Field of Search ... 364/200 MS File, 900 MS File, 364/300

[56] References Cited

U.S. PATENT DOCUMENTS

| | | | |
|---|---|---|---|
| 4,264,953 | 4/1981 | Douglas et al. | 364/200 |
| 4,481,573 | 11/1984 | Fukunaga et al. | 364/200 |
| 4,504,902 | 3/1985 | Gallaher et al. | 364/200 |
| 4,506,323 | 3/1985 | Pusic et al. | 364/200 |
| 4,523,206 | 6/1985 | Sassier | 364/200 |
| 4,530,055 | 7/1985 | Hamstra et al. | 364/200 |
| 4,577,274 | 3/1986 | Ho et al. | 364/200 |
| 4,622,631 | 11/1986 | Frank et al. | 364/200 |
| 4,638,431 | 1/1987 | Nishimura | 364/200 |
| 4,669,043 | 5/1987 | Kaplinski | 364/200 |
| 4,670,858 | 6/1987 | Almy | 364/200 |
| 4,675,811 | 6/1987 | Kishi et al. | 364/200 |
| 4,713,755 | 12/1987 | Worley, Jr. et al. | 364/200 |
| 4,733,348 | 3/1988 | Hiraoka et al. | 364/200 |
| 4,733,350 | 3/1988 | Tone et al. | 364/200 |
| 4,747,043 | 5/1988 | Rodman | 364/200 |
| 4,755,930 | 7/1988 | Wilson, Jr. et al. | 364/200 |
| 4,775,955 | 10/1988 | Liu | 364/200 |
| 4,811,203 | 3/1989 | Hamstra | 364/200 |

(List continued on next page.)

FOREIGN PATENT DOCUMENTS 0153109 8/1985 European Pat. Off. .
0185137 6/1986 European Pat. Off. .

OTHER PUBLICATIONS

Electronic message from Freige PA on the subject, "Abstract for Pradeep Sindhu 'The Dragon Memory System', 11-12-85," Oct. 16, 1985.

(List continued on next page.)

Primary Examiner—Eddie P. Chan
Assistant Examiner—Kevin A. Kriess
Attorney, Agent, or Firm—James T. Beran

[57] ABSTRACT

Each housekeeping command calls for a corresponding combination of write back and flag reset operations. In laundering, a write back operation is performed for owner entries in a specified address set without invalidating those entries. In flushing, a launder is followed by a flag reset invalidating the entries in the address set. Also, the command indicates which of the valid flags should be reset. In demapping, only the flags making an entry inaccessible to the cache's processor are reset. The entries in the address set are selected based on two numbers which together provide a base three number. Each base three digit of this number specifies whether the corresponding real address bit of the entry will match if it is one or zero or "don't care". This permits housekeeping on any consecutive range of N addresses by specifying no more than 2 $\log_2 N$ address sets which exactly cover that range. A processor initiates housekeeping by causing its cache to send a command indicating the operations to be performed and the numbers selecting the address set. In response, all caches pull down a line indicating housekeeping in progress, and that line remains down until the last cache has completed housekeeping, at which time the initiating processor is freed. Meanwhile, however, each of the caches interrupts housekeeping if it receives a command, so that non-housekeeping functions are not delayed by housekeeping. For this purpose, the execution of a housekeeping command is divided into incremental write back and flag reset operations after each of which the cache tests whether it has received a command. If not, housekeeping continues with the next write back or flag reset operation.

27 Claims, 5 Drawing Sheets

U.S. PATENT DOCUMENTS

| | | | |
|---|---|---|---|
| 4,811,209 | 3/1989 | Rubinstein | 364/200 |
| 4,812,969 | 3/1989 | Takagi et al. | 364/200 |
| 4,819,159 | 4/1989 | Shipley et al. | 364/200 |
| 4,827,401 | 5/1989 | Hrustich et al. | 364/200 |
| 4,849,881 | 7/1989 | Eguchi | 364/200 |
| 4,885,680 | 12/1989 | Anthony et al. | 364/200 |

OTHER PUBLICATIONS

Sindhu, "The Dragon TM Memory System", Slides shown with talk delivered Nov. 12, 1985.

Katz, R. H. et al., "Implementing a Cache Consistency Protocol", *Proceedings: 12th Annual International Symposium on Computer Architecture*, Jun. 17–19, 1985, Boston, Computer Society Press, Piscataway, N.J., 1985, pp. 276–283.

Goodman, James R., "Using Cache Memory to Reduce Processor-Memory Traffic", *10th Annual International Symposium on Computer Architecture*, 1983, Computer Society Press, Piscataway, N.J., 1983, pp. 124–131.

Monier, Louis et al., "The Architecture of the Dragon", delivered at IEEE 1985 Compcon, San Francisco, Spring 1985.

Koo, James T., "Integrated-Circuit Content-Addressable Memories", in Hodges, D. A., (Ed.) *Semiconductor Memories*, IEEE Press, New York, 1972, pp. 263–270.

Bartlett, James et al., "Associative Memory Chips: Fast, Versatile, —And Here", in Riley, W. B., (Ed.) *Electronic Computer Memory Technology*, McGraw-Hill, New York, 1971, pp. 217–221.

Intel Bipolar LSI Memory 3104, in Hodges, D. A., (Ed.) Semiconductor Memories, IEEE Press, New York, 1972, pp. 271–278.

McCreight, E. M., "The Dragon Computer System", *Proceedings of the NATO Advanced Study Institute on Microarchitecture of VLSI Computers*, Urbino, Jul. 1984, pp. 83–101.

MULTIPROCESSOR CACHE MEMORY HOUSEKEEPING

This is a continuation of application Ser. No. 06/929,967, filed Nov. 12, 1986, abandoned.

BACKGROUND OF THE INVENTION

The present invention relates to operations performed by cache memories in a multiprocessor. More specifically, the operations, referred to generically as housekeeping operations, involve looking for entries stored in the cache which must be operated upon and performing the appropriate operation on those entries.

A simple form of housekeeping is the invalidation process described in U.S. Pat. No. 4,481,573. When one of the processors on a bus writes data to an entry in its cache, the other processors on that bus receive a signal causing them to invalidate that same data if they are storing it. The data is identified by a virtual address sent over the bus.

Another form of housekeeping is a flush, described briefly in Katz, R. H., Eggers, S. J., Wood, D. A., Perkins, C. L. and Sheldon, R. G., "Implementing a Cache Consistency Protocol", *Conference Proceedings: The 12th Annual International Symposium on Computer Architecture*, IEEE Computer Society Press, Piscataway, N.J. 1985, pp. 276-283 as a step for moving data back to main memory. In the multiprocessor described by Katz et al., one processor's cache may be the owner of a cache entry which has been written by that processor, in which case the cache entry as stored by that cache is written back to memory. Katz et al. also describe operations in which copies of an entry in caches other than the owner are invalidated, as in the invalidation process described above. U.S. Pat. No. 4,264,953 describes a more complex form of housekeeping, called a purge operation, which affects cache entries whose addresses are within a range of addresses. This is used where the corresponding data within that range in main memory has been modified, perhaps with data from another source, such as an I/O device, or by changing from non-shared to shared. As a result, any cache entries within the range will be storing potentially incorrect data. Each cache receives a signal identifying the purge operation and also receives two signals indicating the upper and lower limits of the range of addresses to be purged. The respective processor of the cache sends each cache address in sequence. When a cache contains an entry for an address from the processor and that address is within the range, the cache modifies that entry so that if its address is later sent by the processor, a cache miss will occur, requiring retrieval of the correct data from main memory.

It would be advantageous to have housekeeping techniques which are more efficient and provide a wider variety of operations.

SUMMARY OF THE INVENTION

The present invention provides housekeeping techniques which allow the writing of data back to memory from a set of addresses. These techniques are efficient and are suitable for a shared memory multiprocessor. In addition, the techniques can be used for a wide variety of housekeeping operations. One aspect of the invention is based on the recognition that it is desirable to have housekeeping operations which can write cache entries back to memory without invalidating those entries. The invention is particularly useful in a system employing snoopy caches, each connected between a processor and a bus. Each snoopy cache contains a plurality of entries and each entry is accessible both by a virtual address received from the processor and by a real address received from the bus. Each entry thus contains a virtual address and a real address which are stored in a content-addressable memory (CAM) and also contains the associated data stored at that real address location in main memory. Each entry also contains a number of flags which indicate the state of the entry, and these flags typically include an owner flag discussed below and one or more valid flags indicating whether the entry is valid. Thus, this aspect of the invention involves writing the data from a cache entry back to memory without resetting the valid flags, so that the entry remains valid.

Each cache determines whether a specific cache entry should be written back to memory. Although entries corresponding to a given real address in memory may be stored in more than one cache, at most one of those entries should be written back to that real address. A cache should ordinarily write an entry back only if that entry has been modified while in the cache and has not yet been written back to memory. Conventionally, the cache which should write an entry back is designated as owner of that entry by setting the owner flag in the entry. A cache memory implementing this aspect of the invention thus includes circuitry which provides a signal indicating whether a requested housekeeping operation includes writing back to memory. It also includes circuitry which selects a cache entry within a set of addresses to be operated on, and circuitry which, for each selected cache entry, determines whether its owner flag is set and, if so, causes it to be written back to memory. Although that entry's owner flag is then reset, its valid flags are not.

The cache memory also includes circuitry which, when valid flags are to be reset, resets the appropriate valid flags of all the cache entries within the affected set of addresses. This aspect of the invention is based on the recognition that the cache memory can contain circuitry responsive to the specific housekeeping command to determine which valid flags are reset, so that any of a variety of housekeeping commands can be executed through a sequence of write back and flag reset operations. In particular, one housekeeping command, referred to as launder, involves writing entries back to memory without resetting valid flags. Another, referred to as flush, involves writing entries back to memory and then resetting their valid flags so that they are no longer valid for any purpose and are therefore inaccessible both from the processor side and from the bus side. Another, referred to as demap, involves resetting only those valid flags of each entry which make it inaccessible from the processor side, while leaving it accessible from the bus side. Each of these commands can be executed with a sequence of write back and flag reset operations. In order to select the cache entries within a specified address set, the address of each entry must somehow be compared with the address set. Another aspect of the invention is based on the discovery of a simple comparison technique which can be implemented in a cache memory in an extremely efficient manner. The housekeeping command is received with two binary numbers of equal length which, in combination, specify the address set. The four possible values which the two numbers present at each bit position are divided into two sets, one set of which indicates that cache entry address bits corresponding to that position should be compared and the other set of which indicates that the corresponding cache entry address bits should be disregarded. The group of bit positions in which the two numbers have values in the first set are the bit positions at which a cache entry address must match in order to be one of the specified address set, while the other bit positions, having values in the second set, are "don't care" values at which the corresponding cache entry address bit can take either value. This comparison technique thus permits selection of a cache entry in one cycle, and the comparison may be done by circuitry included in the content-addressable memory (CAM) in which the entry's address is stored. Specifically, the entry's real address is compared to determine whether it is in a specified set of real addresses. In addition, this technique permits the specification of any given range of N consecutive addresses using a limited group of pairs of numbers, the group including no more than 2 $\lceil \log_2 N \rceil$ pairs.

Another aspect of the invention is based on the recognition that the efficiency of housekeeping operations is not only a function of how rapidly they are performed, but also of how much they disrupt the other cache operations. This aspect of the inventoin is based on the discovery of a technique for executing housekeeping operations on a set of cache entry addresses which does not interrupt non-housekeeping operations. This technique makes use of an additional signal controlled by the caches which indicates when the housekeeping operation is completed. Rather than maintaining control over the caches during housekeeping, the device which initiated housekeeping can simply wait until the signal indicating housekeeping completion is received. As a result, each cache can treat housekeeping as its lowest priority task and continue its non-housekeeping operations without interruption. This aspect of the invention is also based on the discovery of a technique for executing a housekeeping operation on a set of cache entry addresses in relatively short, independent steps, so that a cache which begins housekeeping can quickly be interrupted to perform non-housekeeping operations on demand.

These and other objects, features and advantages of the invention will be understood more fully from the following description together with the drawings and claims.

DETAILED DESCRIPTION OF THE PREFERRED EMBODIMENTS

A. General Description

During operation of a shared memory multiprocessor in which each processor has a respective cache memory, it is useful to be able to perform certain operations on all cache entries whose addresses are within a specific address set. For example, it is useful to be able to reset valid flags in all entries in a given range to indicate that those entries contain invalid data. It would also be useful to write the contents of entries in a given range back to memory, for reasons discussed in more detail below. These operations are particularly useful in a system in which snoopy caches perform a consistency protocol based on ownership, as a result of which main memory may have stale, or out-of-date, data. See Katz, R. H., Eggers, S. J., Wood, D. A., Perkins, C. L. and Sheldon, R. G., "Implementing a Cache Consistency Protocol", *Conference Proceedings: The 12th Annual International Symposium on Computer Architecture*, IEEE Computer Society Press, Piscataway, N.J., 1985, pp. 276-283, incorporated herein by reference, for a description of such a protocol.

Figure 1:
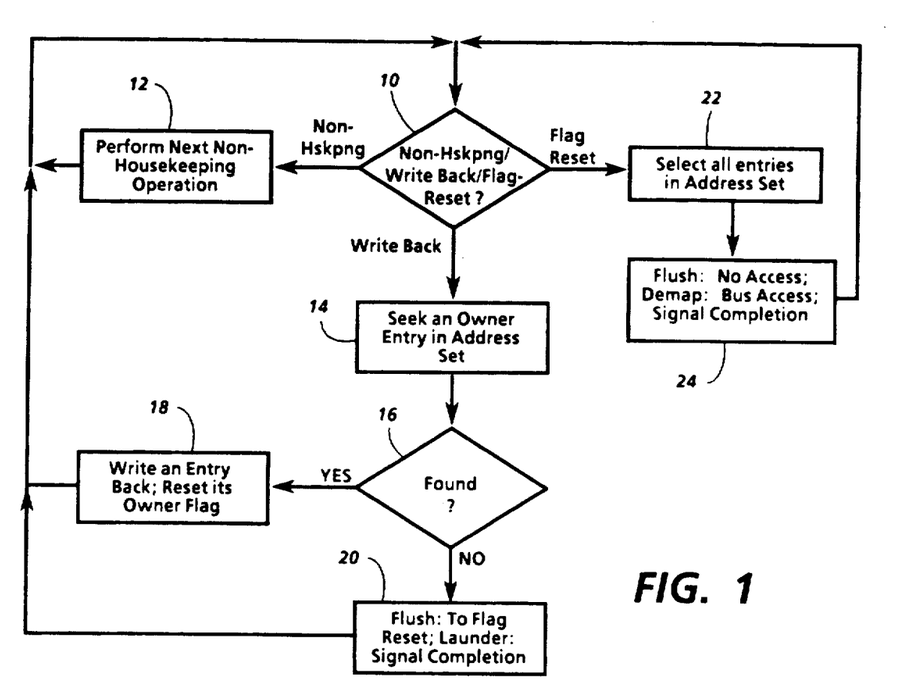
FIG. 1 is a flow chart showing cache memory operations including housekeeping according to the invention.

FIG. 1 shows a sequence of cache memory operations according to the invention, including housekeeping operations making it possible to reset flags, write back entries or both for entries within a set of addresses. As discussed below, the set of addresses may be specified by a pair of numbers, and an inclusive set of addresses may be specified by a group of pairs of numbers, each pair in the group specifying a subset for which the housekeeping operations are performed separately. The steps in FIG. 1 are performed within each of the caches, but the result is a housekeeping operation affecting the entire multiprocessor.

A cache performing the operations of FIG. 1 determines in box 10 whether to perform non-housekeeping operations, write back operations or flag reset operations. This decision is based primarily on whether non-housekeeping operations are waiting to be performed, either in response to that cache's processor or in response to other devices in the system. Non-housekeeping operations are given priority over housekeeping operations, so that if any such operations are waiting to be performed, the next non-housekeeping operation is performed in box 12.

The cache continues through the cycle in boxes 10 and 12 until all waiting non-housekeeping operations are performed. At that time it decides whether to perform one of two types of housekeeping operations, write back to memory or flag reset. As noted above, it is desirable in some instances to perform a write back without invalidating the entry in the cache, and dividing housekeeping into these two types of operations makes it possible to do so. In general, then, the invention allows writing back without resetting flags, referred to herein as laundering; writing back and then resetting valid flags, referred to herein as flushing; and resetting virtual address valid flags without writing back, referred to herein as demapping. Each of these three combinations of housekeeping operations is useful under appropriate circumstances, and a command received by the cache to initiate housekeeping indicates which of these three combinations is to be performed. At any given time, cache memory is able to determine whether the next housekeeping operation to be performed is write back or flag reset.

If write back is next, the cache seeks a stored entry which is within the address set to be written back and which is the owner of its data, in box 14. The owner flag of an entry indicates when set that that entry should be written back to memory in the event of a write back. As noted above, at most one entry in the set of entries corresponding to a given memory address may have its owner bit set. The test in box 16 determines whether an owner entry in the address set was found, and if so that entry is written back to memory and its owner flag is reset in box 18. This completes a housekeeping suboperation, and the cache then returns to determine its next operation in box 10.

A series of write back operations will ordinarily continue until no more owner entries are found in box 16. At that point, appropriate steps in box 20 are taken according to whether the write backs were performed as part of laundering or part of flushing. If flushing, data in the cache is modified so that its next housekeeping operation will be a flag reset. But if laundering, the cache provides a signal that housekeeping is completed. In either case, it returns to box 10.

If flag reset is the next housekeeping operation, the cache selects all entries within the specified address set in box 22. In box 24 appropriate steps are taken according to whether the flag reset is part of flushing or demapping. If the flag reset is part of flushing, the flags in those entries are reset so that those entries are invalid for any purpose and cannot be accessed. But if part of demapping, the flags in the selected entries may be reset so that they can still be accessed by a real address from the bus to which the cache is connected, even though they cannot be accessed by a virtual address from that cache's processor. Demap is useful in some instances, and is illustrative of the variety of housekeeping operations available according to the invention. Also in box 24, the cache signals that housekeeping is completed, before returning to box 10.

The steps in FIG. 1 could be implemented in a multitude of ways. We turn now to circuitry which results in an especially efficient execution of a housekeeping operation according to the invention.

B. Cache Housekeeping Circuitry

Housekeeping according to the invention could be implemented in many cache circuits. The cache housekeeping circuitry described below, however, is designed for use in the cache described in copending coassigned U.S. patent application Ser. No. 930,172, now issue as U.S. Pat. No. 4,843,542 incorporated herein by reference. Similar circuitry is also described in copending coassigned U.S. patent application Ser. No. 929,579, now continued as Ser. No. 399,417, also incorporated herein by reference.

Figure 2:
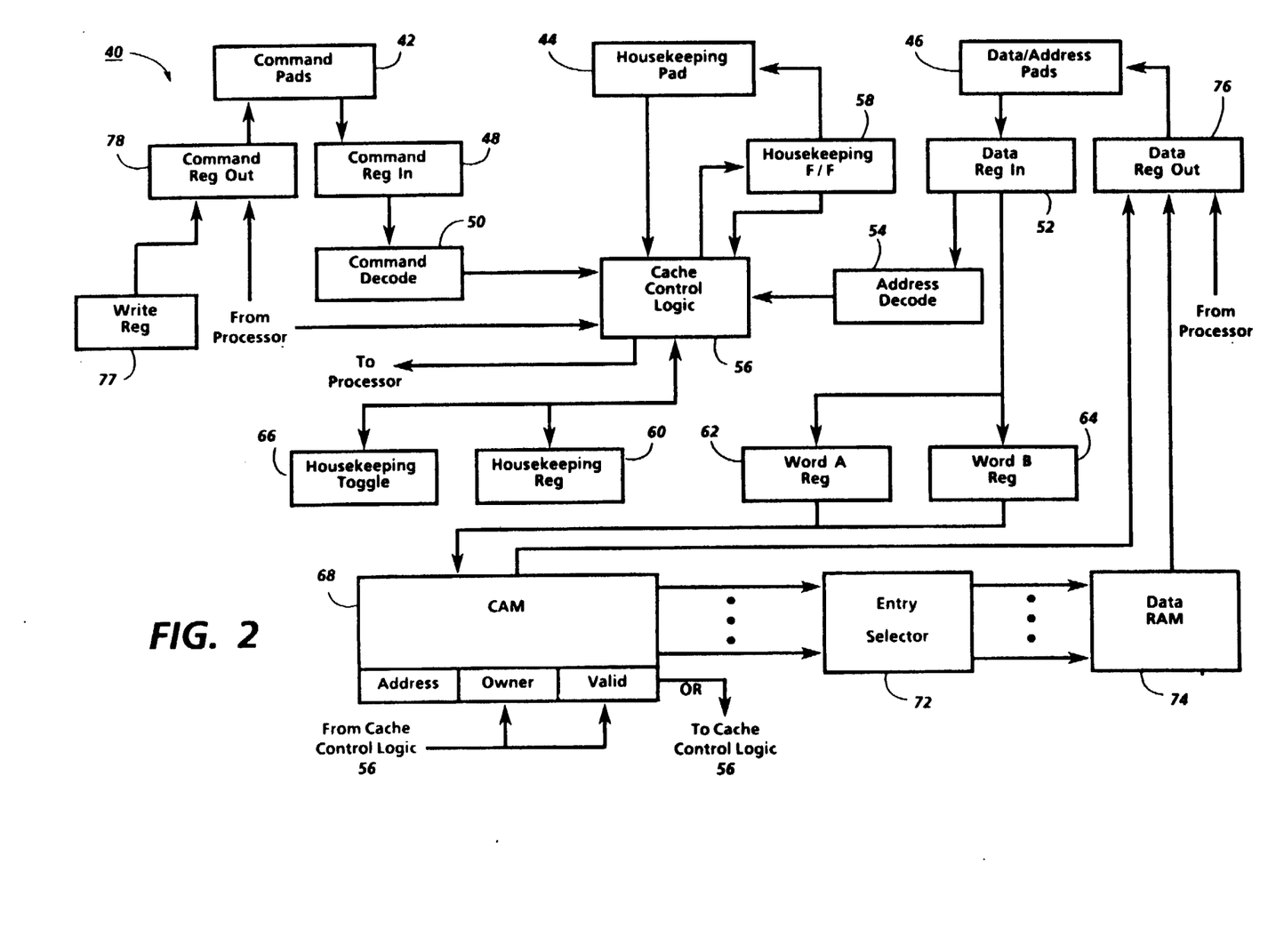
FIG. 2 is a schematic diagram of components of a cache memory for performing housekeeping operations following the steps of FIG. 1.

FIG. 2 shows components of cache memory 40 which relate to housekeeping operations according to the invention. Cache 40 connects to a bus through command pads 42, housekeeping pad 44 and data/address pads 46, as well as other pads not relevant to housekeeping. When a housekeeping command is received, it is temporarily stored in CmdRegIn register 48, and is decoded by command decode 50. Also, some of the bits in DataRegIn register 52 are decoded by address decode 54, indicating which of the housekeeping combinations, launder, flush or demap, has been initiated. The signals from command decode 50 and address decode 54 are received by cache control logic 56, which is connected to the other components of cache 40 by control lines and feedback lines, some of which are shown, so that it can control their operations as described below.

Upon receiving a housekeeping command, cache control logic 56 sets housekeeping flip-flop 58 in order to pull down a line connected to housekeeping pad 44. The purpose of this line will be described in greater detail below. Cache control logic 56 loads data about the command in CmdRegIn 48 into housekeeping register 60. Cache control logic 56 also causes two words which specify a set of addresses to be written from DataRegIn 52 to word A register 62 and word B register 64. Based on the command in CmdRegIn 48, the housekeeping toggle 66 is set or reset to indicate that the first operation to be performed is write back or flag reset, respectively. CmdRegIn 48 and DataRegIn 52, together with associated circuitry, thus serve as means for receiving an input signal indicating a set of addresses and identifying a housekeeping operation to be performed on cache entries with addresses in that set.

CAM 68 is a content-addressable memory storing the address portion of each cache entry, together with owner and valid flags. It is addressable in a manner described below by the contents of word A and B registers 62 and 64, and is connected by entry selector 72 to data RAM 74 which stores the remainder of each entry. CAM 68 and data RAM 74 thus serve together as means for storing a plurality of cache entries, each accessible with a respective address and each including respective data. Additional details of their structure are set forth in copending coassigned U.S. patent application Ser. No. 930,172, now issued as U.S. Pat. No. 4,843,542, incorporated herein by reference.

Figure 3:
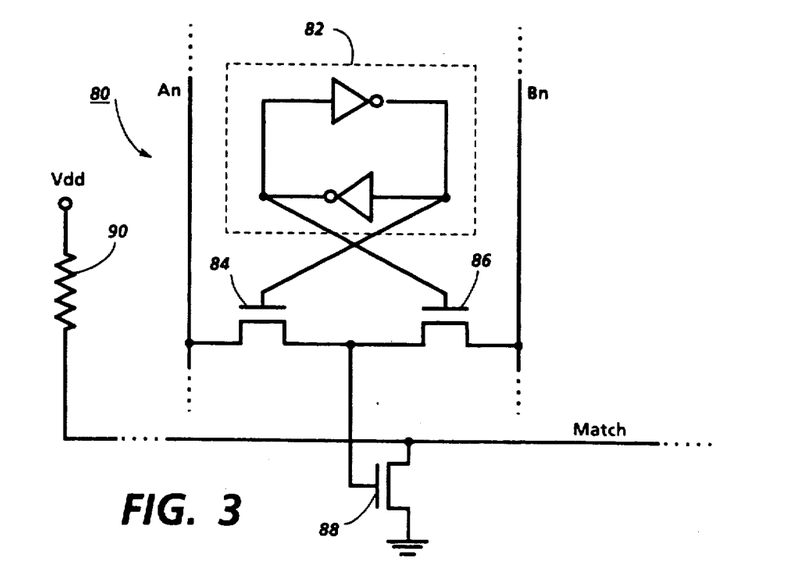
FIG. 3 is a schematic diagram of a circuit for inclusion in the address CAM of FIG. 2.

FIG. 3 illustrates an example of matching circuitry 80 included in a single cell within address CAM 68. Matching circuitry 80 includes a bistable element 82, illustratively a back to back inverter pair, which stores a corresponding bit of a virtual or real address under the control of conventional circuitry (not shown). The corresponding bits from word A register 62 and word B register 64 are provided to matching circuitry 80 on lines $A_n$ and $B_n$, respectively. Transistor 84 will be conductive if element 82 is storing a low value, while transistor 86 will be conductive if element 82 is storing a high value. Therefore, the value stored in element 82 determines whether $A_n$ or $B_n$ controls transistor 88, which, when conductive, pulls down a match line which is otherwise pulled up to $V_{dd}$ through resistor 90.

The operation of matching circuitry 80 can be understood from Table I, which illustrates the values taken by the match line of an entry in response to various combinations of $A_n$, $B_n$ and the value S stored in element 82. As shown, if $A_n$ and $B_n$ have one set of values, then the value on the match line will depend on the value S. But if $A_n$ and $B_n$ have a second, distinct set of values, either both 0 or both 1, then the value on the match line is independent of the value S. Indeed, if $A_n$ and $B_n$ are both 0, then a match will occur regardless of the value S, meaning that the corresponding address bit will be ignored in determining whether a match is present. Such a bit is referred to herein as a "don't care" bit. Thus, the values $A_n$ and $B_n$ define a set of addresses which will result in matches, the size of the set being determined by the number of "don't care" bits and the location of the set depending on the positioning of the "don't care" bits. Table I also shows that the value of the match line when $A_n$ and $B_n$ are both 1 is 0, meaning that no value of S will be matched. This combination of $A_n$ and $B_n$ is not used in the implementation of FIG. 3, because it is sufficient to specify for each bit whether a match will occur when it is set, when it is cleared, or in either case ("don't care"). Thus, word A and B registers 62 and 64 together define a base three number, each trit of which controls the matching of one bit position in CAM 68.

TABLE I

| Address Set | | CAM Values | |
|---|---|---|---|
| $A_n$ | $B_n$ | S | Match |
| 0 | 0 | 0 | 1 |
| 0 | 0 | 1 | 1 |
| 0 | 1 | 0 | 1 |
| 0 | 1 | 1 | 0 |
| 1 | 0 | 0 | 0 |
| 1 | 0 | 1 | 1 |
| 1 | 1 | 0 | 0 |
| 1 | 1 | 1 | 0 |

The match line is connected to matching circuitry like that show in FIG. 3 for each of the bits of the entry in address CAM 68, so that it is high only if all the bits of that entry result in a match. In addition, CAM 68 has bit positions for owner and valid flags, as shown in FIG. 2, and cache control logic 56 directly controls the lines for these bits which are equivalent to $A_n$ and $B_n$. By controlling those lines, cache control logic 56 specifies a value for each owner or valid bit. That value may be set ($A_n=1$, $B_n=0$), cleared ($A_n=0$, $B_n=1$), or "don't care" ($A_n=B_n=0$). Therefore, the match line inputs to entry selector 72 which are high are those of entries whose addresses are in the address set specified by word A register 62 and word B register 64 and which have the combination of flag values specified by cache control logic 56. Logic in CAM 68 enables the flags of those entries whose match lines indicates a match to be modified under control of cache control logic 56.

Entry selector 72 is a conventional circuit which, in response to any combination of inputs on the match lines, provides a single output corresponding to a selected one of the matching entries. Entry selector 72 thus serves as means for selecting a stored entry whose respective address is in the address set and which has the specified flag values.

In addition to the match lines to entry selector 72, CAM 68 also has an output which is the logical OR of all the match lines. This OR output thus indicates when low that no match was found, and this signal is provided to cache control logic 56 for reasons discussed below.

If a match occurs, however, the signal on OR output is high. In response, if a write back operation is in progress, cache control logic 56 causes the entry selected by entry selector 72 to be read out to DataRegOut 76 and written back to memory. In order to accomplish this, cache control logic 56 must first send appropriate control signals to cause that entry's real address to be loaded into DataRegOut 76 and sent to memory with an appropriate command loaded directly by cache control logic 56 or from a WriteReg register 77 into CmdRegOut register 78. Then, the entry's data can be loaded and written back, and cache control logic 56 also resets the owner bit of the selected entry.

If a flags reset operation is in progress rather than a write back operation, cache control logic 56 sends appropriate control signals to cause the appropriate flags of all matching entries in CAM 68 to be reset. The determination of which flags are appropriate is based on the contents of housekeeping register 60, which indicate whether a flush or demap is in progress.

FIG. 2 also shows some circuitry which could be used by cache 40 to initiate a housekeeping operation in all the caches in a system. In response to its processor, cache 40 could provide a housekeeping command from CmdRegOut 78 and words specifying the address set from DataRegOut 76. If cache 40 were the initiator of a housekeeping operation, cache control logic 56 would also monitor housekeeping pad 44 until the housekeeping operation is completed in all caches, at which time the signal from housekeeping pad 44 would go through a low to high transition and cache 40 could again begin to accept commands from its processor.

Cache 40 as described can respond to a variety of housekeeping commands. We turn now to consider some specific useful housekeeping commands and the details of how cache control logic 56 may execute them.

C. Housekeeping Operations

Cache 40 performs a large number of operations other than housekeeping operations. Some of these non-housekeeping operations are described in copending coassigned U.S. patent application Ser. No. 930,172, now issued as U.S. Pat. No. 4,843,542, incorporated herein by reference. If cache 40 interrupted its non-housekeeping operations whenever a housekeeping command was received it might become extremely slow to respond, since each housekeeping command could require substantial execution time. Therefore, one aspect of the invention is to execute housekeeping operations without interrupting non-housekeeping operations. Cache control logic 56 serves both as the means for executing non-housekeeping operations and as the means for executing housekeeping operations simultaneously with non-housekeeping instructions without interrupting non-housekeeping operations.

Figure 4:
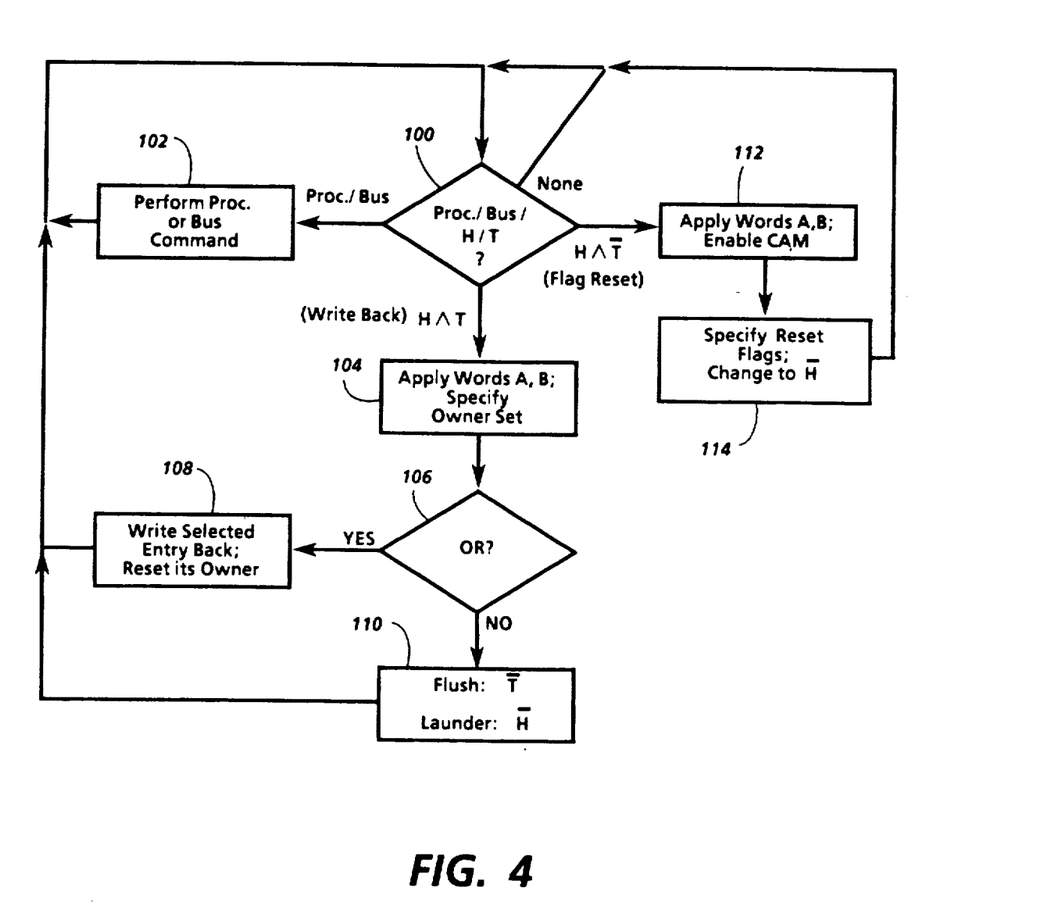
FIG. 4 is a flow chart illustrating the operation of the components in FIG. 2.

FIG. 4 illustrates how cache control logic 56 performs these functions, and generally follows FIG. 1, described above. The basic cycle which cache control logic 56 will follow while idling is to do the test in box 100 looking for operations to be done. If none, it will repeat the test. The operations to be done include responding to a command from the bus or from its processor and proceeding with a housekeeping operation which is waiting, indicated by H representing the value stored in housekeeping flip-flop 58. If a command has been received, an appropriate operation is performed in box 102 before returning to box 100. But if no command is received and a housekeeping operation is waiting, cache control logic will decide whether the waiting housekeeping operation calls for a write back or a flag reset.

To decide whether to do write back or flag reset, cache control logic 56 checks housekeeping toggle 66, represented by T. If T is set, a write back is performed, beginning by applying the words in word A and B register 62 and 64 to CAM 68, in box 104. At the same time, cache control logic 56 specifies that the owner bit must be set and that appropriate valid bits must be set to obtain a match. The OR line from CAM 68 will indicate to cache control logic 56 whether a match occurred, in box 106. If so, cache control logic 56 will load the output from RAM 74 to DataRegOut 76 and will proceed with a write back to memory, which may tie up the cache for some time. At the same time, cache control logic 56 will send a signal to reset the owner bit of the entry selected by entry selector 72, using logic in CAM 68 which is responsive to entry selector 72. The write backs will continue until no match is found, in which case the toggle 66 will be reset to indicate a flag reset operation if a flush is in progress or the flip-flop 58 will be reset to indicate completion of a housekeeping operation if a launder is in progress, as shown in box 110. Then the test in box 100 is repeated.

When the test in box 100 determines that a housekeeping operation is waiting but toggle 66 is reset, cache control logic 56 applies the words in word A and B register 62 to CAM 68 in box 112 and enables CAM so that the flags of all the matching entries may be reset. Then, in box 114, cache control logic 56 specifies the flags to be reset based on the contents of housekeeping register 60. As noted above, if a flush is in progress, all valid flags will be reset so that these entries are no longer accessible to any other device. But if a demap is in progress, the flag indicating validity of each entry's virtual address may be reset, but the flag indicating validity of its real address may not be, so that it will still be accessible with the real address. Then, also in box 114, flip-flop 58 is cleared to signal completion of housekeeping operations.

The steps in FIG. 4 thus ensure that non-housekeeping operations will not be interrupted by housekeeping operations. Furthermore, since address CAM 68 responds to word A and B registers 62 and 64 in a single cycle, the handling of each housekeeping operation proceeds very rapidly unless a write back is delayed, and a new non-housekeeping command received during the handling of an entry will be only slightly delayed. Thus, cache control logic 56 serves as means for executing both housekeeping operations and non-housekeeping operations without interrupting the non-housekeeping operations.

The flush and launder operations according to the invention are particularly useful for certain devices in a shared memory multiprocessor. We turn now to such a multiprocessor system for an example of how a housekeeping operation is initiated.

D. Initiating Housekeeping

In some shared memory multiprocessors, I/O devices or other devices may be accessible to the processors through a portion of the real address range over the bus. Such a device must in some instances be able to make its data consistent with the data in the caches so that it can access that data without using the bus. Or the device may be required to update its data locally off of the bus without permitting the caches to access it. These are examples of when the launder and flush operations, respectively, are useful.

Figure 5:
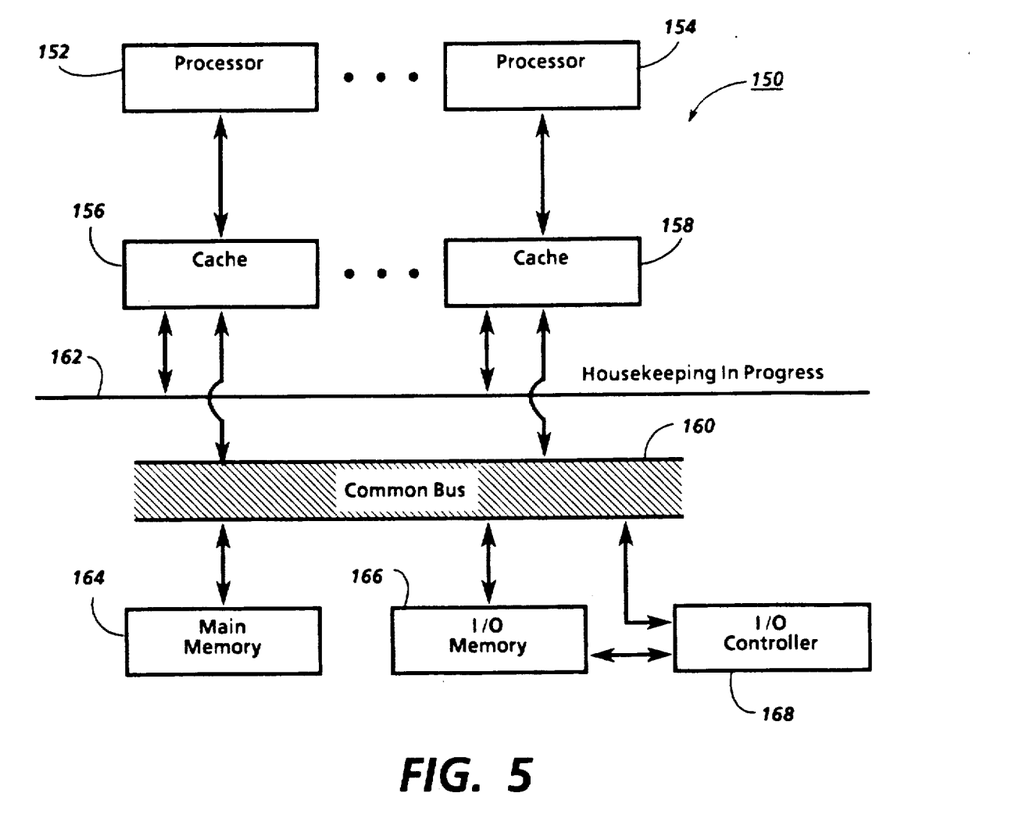
FIG. 5 is a schematic diagram of a multiprocessor system in which the cache memory of FIG. 2 may be utilized.

FIG. 5 shows a shared memory multiprocessor system 150 which includes processors 152, 154, each with a respective cache 156, 158. Each cache is connected to common bus 160 and also to a HousekeepingInProgress line 162 via its housekeeping pad 44, shown in FIG. 2. Each real address from the caches accesses main memory 164 or I/O memory 166, depending on the value of the real address. I/O memory 166 operates under the control of I/O controller 168 which is also connected to bus 160. I/O memory 166 may for example be a display memory accessible with real addresses. Data from the display memory must typically be read out for display much faster than operations on bus 160 would permit, so that I/O controller 168, a display processor, may need to update or read the display memory's current data without accesses from bus 160. One of the processors 152 or 154, in executing its software, may initiate such an operation after first initiating either a flush or launder, which will cause each entry whose owner bit is set to be written to display memory prior to the desired operation. If a read operation will be performed, a launder operation is adequate, because the data will not be changed by the operation. But if an update operation will be performed, a flush operation is required, so that the caches will be forced to retrieve the updated data from the display memory if they require it for further processing.

Figure 6:
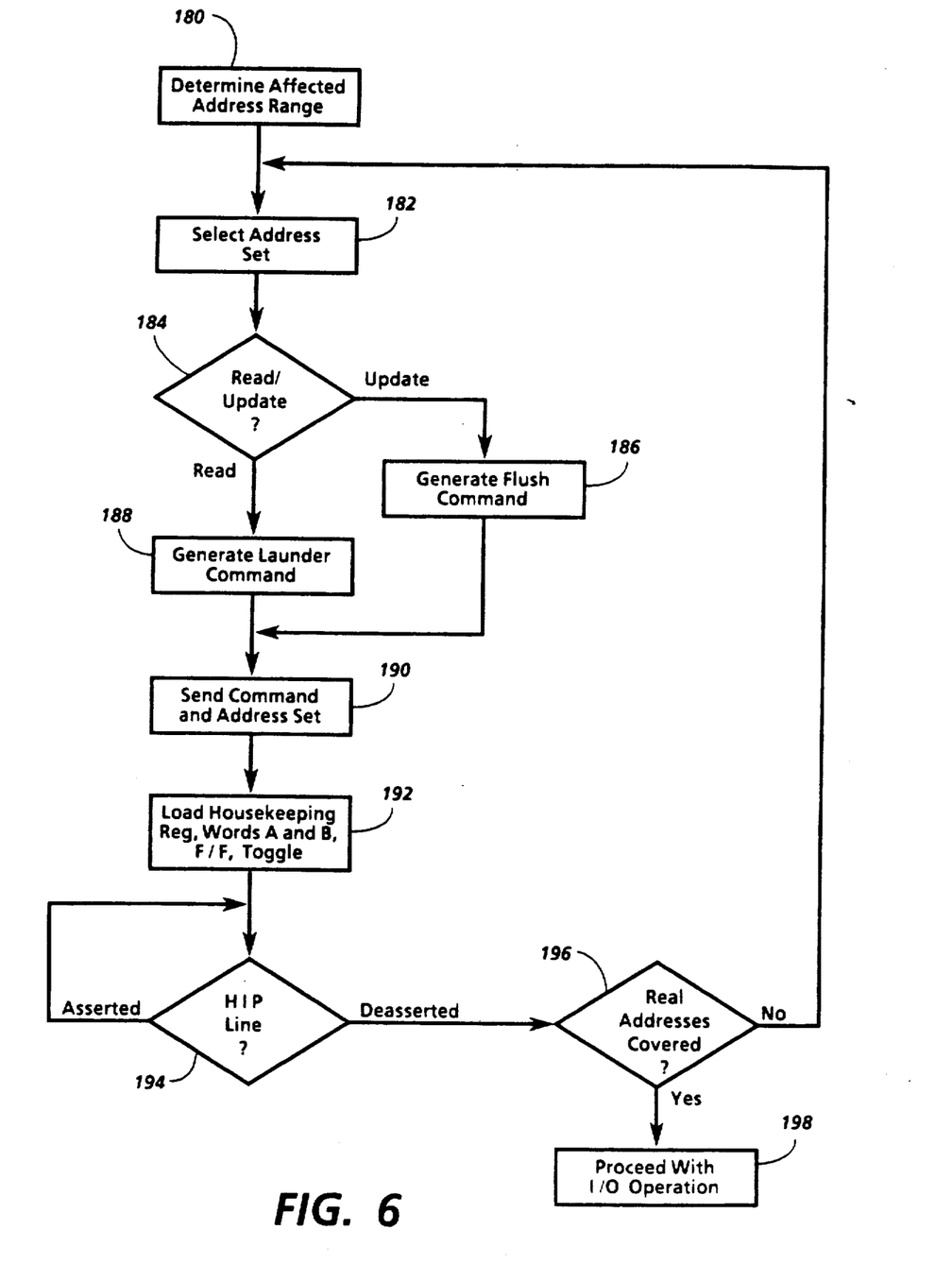
FIG. 6 is a flow chart of steps followed in initiating a housekeeping operation according to the invention.

FIG. 6 illustrates how a processor initiates a housekeeping operation. It will begin by determining the address range to be affected by the read or update operation to be performed, in box 180. In box 182, an address set is selected by generating the two values for words A and B which will be used to match entries. Then, in box 184, the processor determines whether the operation to be performed is a read or an update. If an update, it generates a flush command in box 186, but if a read, it generates a launder command in box 188. Given that there are only a few housekeeping commands, the specific commands may be identified by a small field, such as two bits. Thus these steps merely involve selecting the appropriate values for those bits.

The processor sends the command and the two values indicating the address set through its cache to all the caches in system 150, in box 190. This may require more than one cycle on bus 160. The processor's cache, like all the caches in the system, will respond in box 192 by loading its housekeeping register 60, its word A and B registers 62 and 64, its housekeeping toggle 66 and its housekeeping flip-flop 58 with the appropriate values. Specifically, the housekeeping flip-flop will be given a value which causes HousekeepingInProgress (HIP) line 162 to be asserted, indicating housekeeping is in progress. It will remain asserted until all caches have completed the requested housekeeping operations.

The initiating processor's cache will also send a signal back to its processor causing its processor to wait until the HIP line becomes deasserted. Thus, after that cache has completed its own housekeeping operation, it must continue to wait until all the other caches have done so. Therefore, in box 194, it tests the HousekeepingInProgress (HIP) line to determine whether all caches have completed the initiated housekeeping operation. If not, the HIP line will be asserted, and the test in box 194 will be repeated. But if so, the HIP line will be deasserted. The processor is then released and tests in box 196 to determine if all affected real addresses are covered by the address set. If not, one or more additional address sets must be selected, so it returns to box 182. When all affected real addresses have been covered, the processor proceeds in box 198 to command the I/O operation.

The address set selected in box 182 will bear directly on whether the real addresses have been covered in box 196. If the affected real addresses are a range of consecutive addresses, the address set could be selected so that the range would certainly be covered without regard to the number of unaffected entries which would be flushed or laundered. For example, if the range is specified by a binary starting address and binary length, the low order bits of the length up to the highest order non-zero bit could be summed with the corresponding bits of the starting address. The highest order non-zero bit of the sum could be taken as the highest order "don't care" bit, and all the bits of lower order than it would also be "don't care" bits. The only bits which would not be "don't care" bits would be the higher order bits of the starting address. This approach is sloppy but fast and simple. A more refined approach would take advantage of the fact that any range can be completely covered by at most 2 ⌈log₂N⌉ address sets, where N is the length of the range and ⌈log₂N⌉ is the next integer than log₂N. The choice of approach may depend on the processing power available in I/O controller 168 and on the effect of excess deletion of entries. This aspect of the invention thus allows a flexible choice of the extent of excess deletion.

E. Miscellaneous

The invention has been described with reference to snoopy caches in a shared memory multiprocessor system, but could be applied to other cache memories in other types of systems. A cache memory according to the invention could be a single VLSI chip, or it could take another appropriate form.

Many other modifications, variations and improvements will be apparent to those skilled in the art from the above description, the drawings and the attached claims. The scope of the invention is not limited to the embodiments described and shown, but only by the attached claims.

What is claimed is:

1. A cache memory comprising:

memory circuitry for storing cache entries, the memory circuitry comprising address portion means for storing address portions of cache entries, flag portion means for storing flag portions of cache entries, and data portion means for storing data portions of cache entries, the address portion means including an address bit position for storing a respective bit from a cache entry's address portion;

control circuitry for responding to housekeeping commands, each housekeeping command requesting a respective housekeeping operation and including respective first and second numbers that together define a set of addresses on which the respective housekeeping operation is to be performed, the respective first number including a first bit and the respective second number including a second bit; each respective housekeeping operation including a first suboperation, the first suboperation being one of a write back operation that can be performed on a cache entry's data portion and a flag reset operation that can be performed on a cache entry's flag portion; the control circuitry comprising first suboperation means connected to the data portion means and the flag portion means of the memory circuitry for performing the first suboperation; the control circuitry further comprising number providing means for responding to one of the housekeeping commands by providing the respective first and second numbers; and matching circuitry connected to the control circuitry for receiving the first and second numbers from the number providing means and connected to the memory circuitry for receiving a cache entry's address portion from the address portion means; the matching circuitry comprising match signal means for providing a match signal in response to the first and second numbers and a cache entry's address portion if the address portion is in the set of addresses defined by the first and second numbers; the matching circuitry further comprising bit position logic connected for receiving the first bit of the first number and the second bit of the second number from the number providing means and for receiving the respective bit of a cache entry's address portion from the address bit position; the bit position logic providing a bit position match signal, the bit position match signal depending on the value of the respective bit stored in the address bit position if the first and second bits together are in a first set of values, the bit position match signal being independent of the value of the respective bit if the first and second bits together are in a second set of values; the match signal means providing the match signal based on the bit position match signal; the first suboperation means further being connected to the matching circuitry for receiving the match signal from the match signal means, the first suboperation means performing the first suboperation on a cache entry's data portion or flag portion only if the match signal means provides the match signal in response to the first and second numbers and the cache entry's address portion.

2. The cache memory of claim 1 in which the flag portion of a cache entry includes an owner flag, the owner flag having either a first value or a second value; the owner flag, when it has the first value, indicating that a cache entry should be written back to memory in a write back operation and, when it has the second value, indicating that a cache entry should not be written back to memory; the first suboperation means comprising owner match signal means for providing an owner match signal when the first suboperation is a write back operation; the matching circuitry further being connected to the memory circuitry for receiving a cache entry's owner flag from the flag portion means and to the control circuitry for receiving the owner match signal from the owner match signal means; the matching circuitry further comprising owner flag logic for responding to the owner match signal by providing an owner flag match signal if the cache entry's owner flag has the first value, the match signal means providing the match signal only if the owner flag match signal indicates that the cache entry's owner flag has the first value.

3. The cache memory of claim 2 in which the first suboperation means further comprises owner flag changing means connected to the flag portion means for changing the owner flag of a cache entry to the second value when a write back operation on the cache entry is completed.

4. The cache memory of claim 1 in which the number providing means comprises first and second registers for storing the first and second numbers, the first register including a first bit store for storing the first bit, the second register including a second bit store for storing the second bit.

5. The cache memory of claim 1 in which the first set of values includes those values for which the first and second bits are different from each other, the second set of values including those values for which the first and second bits are the same.

6. The cache memory of claim 1 in which the memory circuitry comprises a content addressable memory, the address portion means and the flag portion means storing the address portion and the flag portion of a cache entry in the content addressable memory.

7. The cache memory of claim 1 in which the flag portion of a cache entry includes first and second valid flags, each indicating whether the cache entry is accessible through a respective connection to the cache memory, the control circuitry further comprising flag resetting means connected to the flag portion means for selectively resetting the first valid flag or the second valid flag to indicate that the cache entry is not accessible through the respective connection.

8. A system comprising the cache memory of claim 1, the system further comprising a processor connected to the cache memory; the processor comprising housekeeping command means for providing housekeeping commands to the cache memory, the processor further comprising generating means for generating a group of no more than 2 log$_2$N pairs of numbers which specify a group of sets of addresses which cover a range specified by a starting address and length, the respective first and second numbers of each of the housekeeping commands being one of the pairs of numbers.

9. The cache memory of claim 1 in which the respective housekeeping operation of one of the housekeeping commands is a flush operation, the flush operation including the first suboperation and a second suboperation, the first suboperation being a write back operation and the second suboperation being a flag reset operation.

10. The cache memory of claim 1 in which the respective housekeeping operation of one of the housekeeping commands is a launder operation, the launder operation including only the first suboperation, the first suboperation being a write back operation.

11. The cache memory of claim 1 in which the respective housekeeping operation of one of the housekeeping commands is a demap operation, the demap operation including only the first suboperation, the first suboperation being a flag reset operation.

12. A cache memory comprising:
memory circuitry with a memory location for storing a cache entry, the entry including an address portion, a flag portion, and a data portion;
control circuitry for responding to commands including housekeeping commands and non-housekeeping commands, each non-housekeeping command requesting a respective non-housekeeping operation, each housekeeping command requesting a respective housekeeping operation and including respective address data defining a set of addresses on which the respective housekeeping operation is to be performed; each respective housekeeping operation including a set of at least one suboperation, each suboperation in the set being one of a write back operation that can be performed on the data portion of the entry and a flag reset operation that can be performed on the flag portion of the entry; the control circuitry comprising:
suboperation means connected to the memory circuitry for performing each suboperation on the cache entry stored in the memory location;
storing means for responding to each of the housekeeping commands by storing the respective address data; and
operation determining logic for determining whether to perform one of the non-housekeeping operations or a next one of the suboperation set of one of the housekeeping operations; the operation determining logic, upon determining to perform a next suboperation, controlling the storing means to provide the stored address data and causing the suboperation means to perform the next suboperation; and
matching circuitry connected to the control circuitry for receiving the stored address data from the storing means and connected to the memory circuitry for receiving the address portion of the cache entry stored in the memory location; the matching circuitry comprising match signal means for providing a match signal in response to the stored address data and the cache entry's address portion if the address portion is in the set of addresses defined by the stored address data; the operation determining logic being connected to the matching circuitry for receiving the match signal from the match signal means, the operation determining logic causing the suboperation means to perform the next suboperation on the cache entry only if the match signal means provides the match signal in response to the stored address data and the cache entry's address portion.

13. The cache memory of claim 12 in which the control circuitry further comprises housekeeping data means for responding to one of the housekeeping commands by obtaining housekeeping data indicating the respective housekeeping operation's suboperation set.

14. The cache memory of claim 13 in which the housekeeping data indicates that the respective housekeeping operation is one of a flush operation, a launder operation, and a demap operation; the flush operation's suboperation set including a write back operation and a flag reset operation; the launder operation's suboperation set including only a write back operation; the demap operation's suboperation set including only a flag reset operation.

15. The cache memory of claim 12 in which the control circuitry further comprises a toggle data store for storing toggle data indicating a write back operation or a flag reset operation; the operation determining logic comprising suboperation determining logic for determining whether the next suboperation is a write back operation or a flag reset operation from the stored toggle data.

16. The cache memory of claim 15 in which one of the housekeeping operations' suboperation set includes a first suboperation and a second suboperation, the first suboperation being a write back operation and the second suboperation being a flag reset operation, the control circuitry further comprising toggle data means for changing the stored toggle data to indicate a flag reset operation when the suboperation means completes the first suboperation.

17. The cache memory of claim 12 in which one of the housekeeping operations' suboperation set includes a first suboperation that is a write back operation, the memory circuitry having a plurality of memory locations including the first above-mentioned memory location, each memory location being for storing a respective cache entry including an address portion, a flag portion, and a data portion, the suboperation means further being connected for performing each suboperation on the respective cache entries stored in the memory locations; the address portions of a subset of the plurality of cache entries being in the set of addresses defined by the stored address data; the operation determining logic causing the suboperation means to perform the first suboperation in a series of steps, the suboperation means, in each step, performing a write back operation on a respective one of the subset of the cache entries, the operation determining logic further determining after each step of the first suboperation whether to perform one of the non-housekeeping operations or continue the first suboperation.

18. The cache memory of claim 17 in which the match signal means comprises, for each of the memory locations, respective matching logic, each memory location's respective matching logic being connected to the control circuitry for receiving the stored address data from the storing means and to the memory location for receiving the address portion of the cache entry stored in the memory location; each memory location's respective matching logic providing a respective location match signal if the address portion of the cache entry stored in the respective memory location is in the set of addresses defined by the stored address data received from the storing means; the match signal means providing the match signal based on the respective location match signals.

19. The cache memory of claim 12 in which each housekeeping command's respective address data includes first and second numbers, the storing means comprising first and second registers, the first register for storing the first number and the second register for storing the second number.

20. A system comprising the cache memory of claim 12, the system further comprising a bus, the cache memory being connected for receiving housekeeping commands from the bus.

21. The system of claim 20, further comprising a processor connected for providing initiating commands to the cache memory, each initiating command requesting that the cache memory provide a respective one of the housekeeping commands on the bus, the control circuitry being connected for receiving the initiating command; the control circuitry further comprising command providing means connected to the bus for responding to one of the initiating commands by providing the respective housekeeping command on the bus.

22. The cache memory of claim 12 in which the operation determining logic determines to perform the next suboperation only when none of the non-housekeeping operations is waiting to be performed.

23. The cache memory of claim 12 in which the control circuitry further comprises non-housekeeping means for performing a non-housekeeping operation after the operation determining logic determines to perform one of the non-housekeeping operations; the non-housekeeping means performing the non-housekeeping operation without interruption until it is completed.

24. The cache memory of claim 23 in which the control circuitry further comprises a waiting data store for storing waiting data indicating that a housekeeping operation is waiting to be performed, the operation determining logic, after the non-housekeeping operation is completed, determining from the stored waiting data whether a housekeeping operation is waiting.

25. A system comprising:
 a plurality of cache memories, each cache memory comprising:
  memory circuitry with a memory location for storing a cache entry, the entry including an address portion, a flag portion, and a data portion;
  control circuitry for responding to commands including a housekeeping command, the housekeeping command requesting a housekeeping operation, the housekeeping command including address data defining a set of addresses on which the housekeeping operation is to be performed; the housekeeping operation including a suboperation, the suboperation being one of a write back operation that can be performed on the data portion of the cache entry and a flag reset operation that can be performed on the flag portion of the cache entry; the control circuitry comprising housekeeping control means for beginning to perform the housekeeping operation in response to the housekeeping command and for performing the housekeeping operation until it is completed, the housekeeping control means comprising suboperation means connected to the memory circuitry for performing the suboperation on the cache entry stored in the memory location; and
  matching circuitry connected for receiving the address data from the control circuitry and the address portion of the cache entry stored in the memory location; the matching circuitry comprising match signal means for providing a match signal to the suboperation means if the address portion of the cache entry stored in the memory location is in the set of addresses defined by the address data;
  the suboperation means performing the suboperation on the cache entry only if the match signal means provides the match signal in response to the address data;
 a bus connected for providing the housekeeping command to each of the cache memories;
 a housekeeping line connected for providing a signal to the control circuitry of each of the cache memories indicating when the housekeeping operation is completed;
 the housekeeping control means of each of the caches further comprising housekeeping line means connected for controlling the housekeeping line by pulling it to an asserted value when the housekeeping control means begins performing the housekeeping operation and by permitting it to return to a deasserted value when the housekeeping control means completes the housekeeping operation.

26. The system of claim 25, the control circuitry of a first one of the cache memories further comprising command sending means connected for sending the housekeeping command on the bus, the first cache memory's housekeeping control means being connected to receive the signal from the housekeeping line, the first cache memory's housekeeping control means performing only the housekeeping operation until the housekeeping line means of all the cache memories have permitted the housekeeping line to return to the deasserted value.

27. The system of claim 26, further comprising a processor connected for providing an initiating command to the command sending means of the first cache memory, the first cache memory's command sending means sending the housekeeping command on the bus in response to the initiating command.

* * * * *